(12) United States Patent
Schueler et al.

(10) Patent No.: US 9,352,667 B2
(45) Date of Patent: May 31, 2016

(54) FITTING SYSTEM FOR A VEHICLE SEAT

(75) Inventors: Rolf Schueler, Heiligenhaus (DE); Ulrich Lehmann, Alfter (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 274 days.

(21) Appl. No.: 14/115,304

(22) PCT Filed: Mar. 19, 2012

(86) PCT No.: PCT/EP2012/054796
§ 371 (c)(1),
(2), (4) Date: Apr. 8, 2014

(87) PCT Pub. No.: WO2012/150085
PCT Pub. Date: Nov. 8, 2012

(65) Prior Publication Data
US 2014/0210242 A1 Jul. 31, 2014

(30) Foreign Application Priority Data
May 2, 2011 (DE) .......................... 10 2011 100 513

(51) Int. Cl.
*B60N 2/235* (2006.01)
*B60N 2/12* (2006.01)
(52) U.S. Cl.
CPC .............. *B60N 2/2352* (2013.01); *B60N 2/123* (2013.01); *B60N 2/2356* (2013.01)
(58) Field of Classification Search
CPC ..... B60N 2/2352; B60N 2/2356; B60N 2/123
USPC ............................................ 297/367 P, 367 R
See application file for complete search history.

(56) References Cited

U.S. PATENT DOCUMENTS 8,042,872 B2 * 10/2011 Kim ..................... B60N 2/2356
297/367 R
2003/0025377 A1 2/2003 Peters
(Continued)

FOREIGN PATENT DOCUMENTS

CN 1419503 A 5/2003
CN 101208220 A 6/2008
(Continued)

OTHER PUBLICATIONS

Office Action dated Aug. 12, 2014, received in corresponding Japanese application No. 2014-500347 along with English translation, 6 pages.
(Continued)

*Primary Examiner* — Anthony D Barfield
(74) *Attorney, Agent, or Firm* — Foley & Lardner LLP (57) ABSTRACT

In a fitting system for a vehicle seat having at least one fitting by which a rest can be pivoted relative to a seat part from at least one use position to a non-use position, the fitting has a first fitting part with a toothed rim, a second fitting part, having at least one moving bolt which locks the fitting in the use position by interacting with the toothed rim, a prestressed eccentric which moves the bolt radially outward to interact with the toothed rim, and a control cam which moves the bolt radially inward in the event of rotation in the opening direction, to terminate interaction with the toothed rim. The control cam can be rotated in the closing direction in a manner uncoupled from the eccentric, to lock the fitting in the non-use position by interaction between the one bolt and the toothed rim.

10 Claims, 6 Drawing Sheets

(56) References Cited

U.S. PATENT DOCUMENTS

| | | | |
|---|---|---|---|
| 2005/0035640 A1* | 2/2005 | Shinozaki | B60N 2/2358 297/367 R |
| 2007/0145800 A1 | 6/2007 | Thiel et al. | |
| 2008/0136242 A1 | 6/2008 | Stemmer et al. | |
| 2009/0085391 A1 | 4/2009 | Peters et al. | |

FOREIGN PATENT DOCUMENTS

| | | |
|---|---|---|
| CN | 101415584 A | 4/2009 |
| DE | 10 2006 015 560 B3 | 8/2007 |
| DE | 20 2008 008 090 U1 | 10/2008 |

OTHER PUBLICATIONS

Office Action in corresponding Korean Application No. 10-2013-7032020 dated Jan. 5, 2015, and English translation, 7 pages.
Office Action dated Mar. 30, 2015, in corresponding Chinese Application No. 201280014039.8, 6 pages.
First Official Action mailed Mar. 2, 2013, as received in corresponding German Patent Application No. 10 2011 100 513.0.
International Search Report mailed May 7, 2012, as received in corresponding International Application No. PCT/EP2012/054796.

* cited by examiner

FITTING SYSTEM FOR A VEHICLE SEAT

CROSS REFERENCE TO RELATED APPLICATIONS

The present application is a U.S. National Stage of International Application No. PCT/EP2012/054796, filed on Mar. 19, 2012, which claims the benefit of German Patent Application No. 10 2011 100 513.0, filed on May 2, 2011, the entire disclosures of all of which are incorporated herein by reference.

The invention relates to a fitting system for a vehicle seat having the features of the preamble of claim 1.

A fitting system of this type having at both sides a fitting which is constructed as a catch fitting is known from DE 10 2006 015 560 B3. A possible application is that the backrest of the vehicle seat is able to be pivoted into a non-use position and is then intended to be locked by means of the fitting system. The non-use position may, for example, be a pivoting release position. With a manual actuation element, the unlocking of the non-use position does not present any problems since the pretensioning of the eccentric can be overcome. However, if unavoidable unlocking should occur depending on specific circumstances, for example, in the case of pivoting release after the displaced vehicle seat has been returned to its original longitudinal seat position, it may be difficult with a small control signal to unlock the fitting system in the non-use position counter to the pretensioning of the eccentric.

An object of the invention is to improve a fitting system of the type mentioned in the introduction, in particular with regard to the unlocking action. This object is achieved according to the invention by a fitting system having the features of claim 1. The dependent claims relate to advantageous embodiments.

The locking of the fitting in the positions for use provided is reliable in the event of a crash and play-free owing to the (resiliently) pretensioned eccentric. The unlocking is carried out counter to the force of the pretensioning (for example, the springs which act on the eccentric) so that relatively large forces (or paths) are required for this purpose. A locking action in the non-use position does not need to be reliable in the event of a crash and play-free. Therefore, the control cam which co-operates with the bars can be used in order to lock the fitting in the non-use position (with play) independently of the eccentric. For the unlocking action, significantly smaller forces (or paths) are then required so that even small control signals, for example, from memory devices of seat rails, can be used in order to unlock the fitting again in the non-use position.

The eccentric and the control cam are first internally decoupled. The temporary coupling of the two components for the locking and unlocking in the positions for use provided is preferably carried out outside the fitting by means which are provided at that location, that is to say, externally. Accordingly, the actuation member of the eccentric and control cam are intended to be directed outward. The actuation members may be formed on, that is to say, produced integrally with the associated component, for example, as extruded collars or produced separately and secured to the associated component.

Constructing the actuation members in hollow form is preferred, preferably as profiled pipes. The actuation members are preferably fitted one inside the other, preferably concentrically relative to each other, without cooperating directly. The hollow construction also enables a rotationally secure connection with respect to appropriately profiled shafts, which lead, for example, to an actuation element or to a fitting at the other vehicle seat side. If the object of the inclination adjustment of the backrest is not intended to be achieved with the fitting according to the invention, but instead, for example, by a gear fitting, the shaft which is required for driving it can be guided without interaction by means of the hollow actuation members of the eccentric and control cam, preferably concentrically relative thereto.

The fitting system according to the invention is used in vehicle seats, preferably for adjustment of the backrest inclination. However, it can also be used at other locations. The fitting according to the invention may be provided at both vehicle seat sides, or only at one vehicle seat side whilst, at the other vehicle seat side, a conventional fitting without any locking of the non-use position is then provided which, for example, has geometrically identical fitting members and bars, but an internal, direct and permanent coupling between the eccentric and control cam.

The invention is explained in greater detail below with reference to an embodiment which is illustrated in the drawings, in which.

Figure 8:
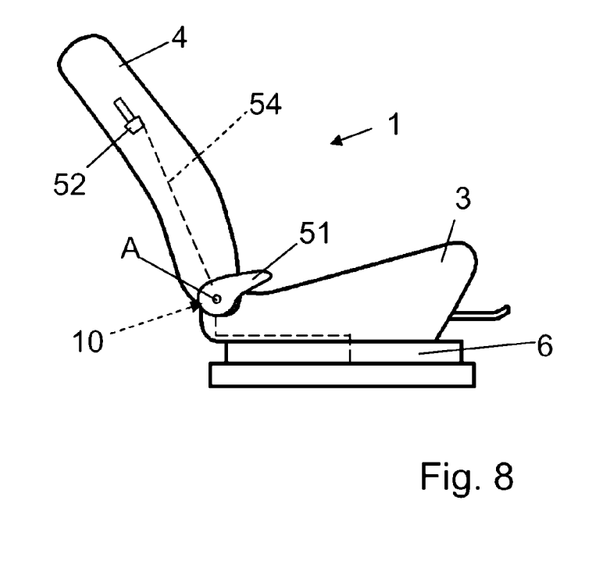
FIG. 8 is a schematic illustration of a vehicle seat.

A vehicle seat 1 for a motor vehicle has a seat member 3 and a backrest 4. The longitudinal seat position of the vehicle seat 1 can be adjusted by means of seat rails 6. The inclination of the backrest 4 relative to the seat member 3 can be adjusted between various positions for use by means of fittings 10. In addition, the backrest 4 which is fitted to the seat member 3 at both sides by means of the fittings 10 can be pivoted relative to the seat member 3 into a non-use position. The non-use position is, for example, a table position for increasing the storage space, or a released pivoted position, in which the pivoted and released backrest 4 facilitates access to a rear seat row.

Figure 1:
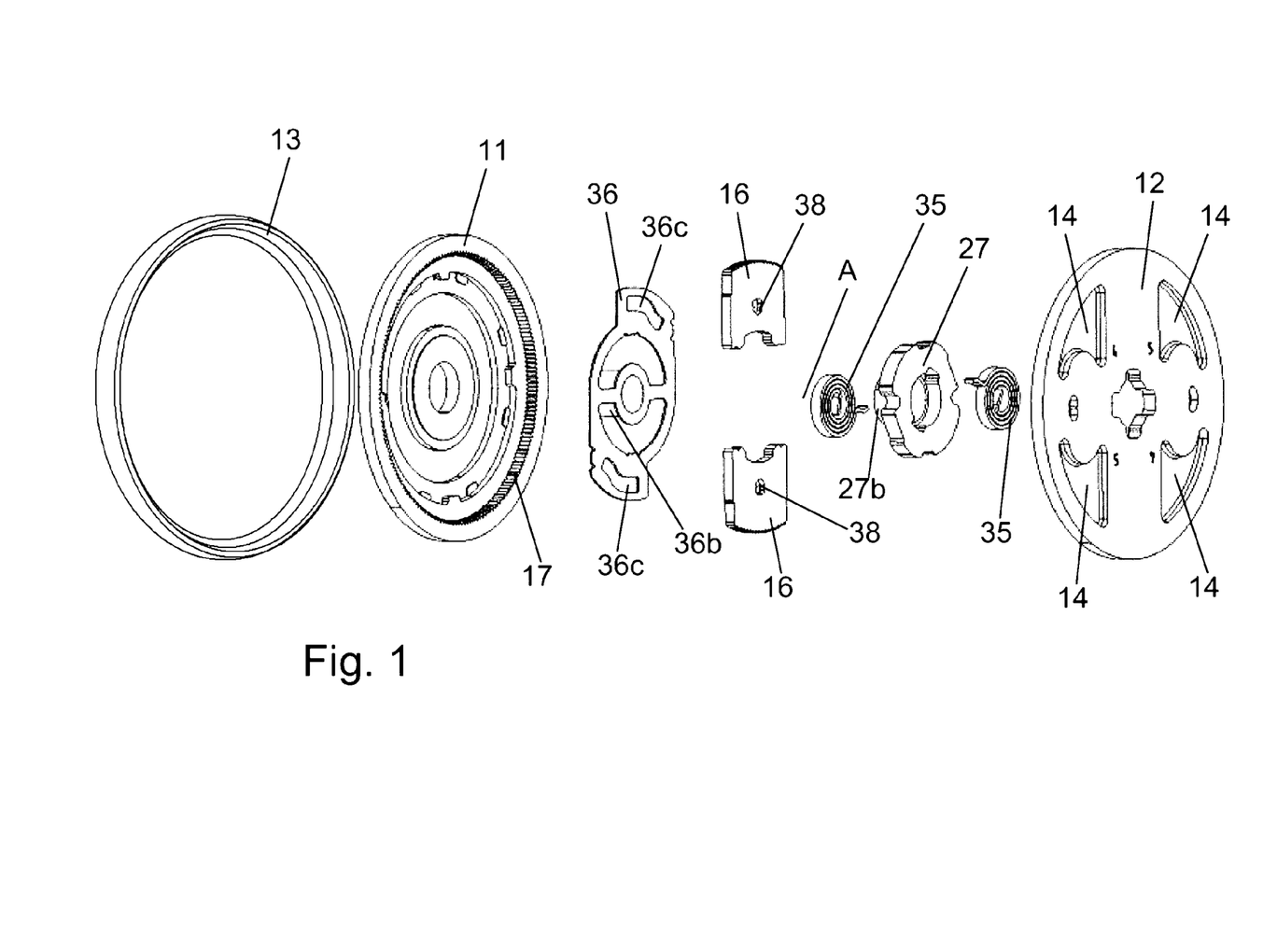
FIG. 1 is an exploded view of the fitting used.

The fitting 10 has a first fitting member 11 and a second fitting member 12, which can be rotated relative to each other about an axis A. The (notional) axis A defines the directional indications used of a cylindrical coordinate system. The two fitting members 11 and 12 can be substantially inscribed in a circular-disc-like form. Both fitting members 11 and 12 preferably comprise metal, in particular steel, which may be at least partially hardened. In order to receive the axially acting forces, that is to say, to axially hold together the fitting members 11 and 12, a surrounding ring 13 is provided. The surrounding ring 13 preferably comprises metal, in particular steel, which is preferably non-hardened. The surrounding ring 13 preferably has a substantially flat annular shape, but may in an alternative embodiment be profiled in an L-shaped manner with a cylindrical portion and a planar annular portion at the end face.

The surrounding ring 13 is securely connected to one of the two fitting members 11 and 12, in this instance in an outer annular portion with the second fitting member 12, for example, by means of laser welding or by means of another securing technique known per se. By means of an inner annular portion, which is arranged in a plane perpendicular relative to the axial direction, the surrounding ring 13, optionally with a sliding ring being interposed, engages over the first fitting member 11 in the radially outer edge region thereof, without impeding the relative movement of the two fitting members 11 and 12. In addition, the inner faces of the two fitting members 11 and 12 facing each other are protected from the infiltration of foreign bodies and contamination and damage.

Therefore, the surrounding ring 13 and the fitting member 11 or 12 which is securely connected thereto surround the other of the two fitting members 11 and 12 which can be moved relative thereto. From a structural viewpoint, the two fitting members 11 and 12 thus together form (with the surrounding ring 13) a disc-like unit.

With the assembly of the fitting 10, the first fitting member 11 is, for example, securely connected to the structure of the backrest 4, that is to say, secured to the backrest. The second fitting member 12 is then securely connected to the structure of the seat member 3, that is to say, secured to the seat member. The associations of the fitting members 11 and 12 can, however, also be transposed, that is to say, the first fitting member 11 would then be secured to the seat member and the second fitting member 12 secured to the backrest. The fitting 10 is in the force path between the backrest 4 and seat member 3.

The fitting 10 is constructed as a catch fitting, in which the first fitting member 11 and the second fitting member 12 can be locked to each other in discrete relative positions.

Figure 2:
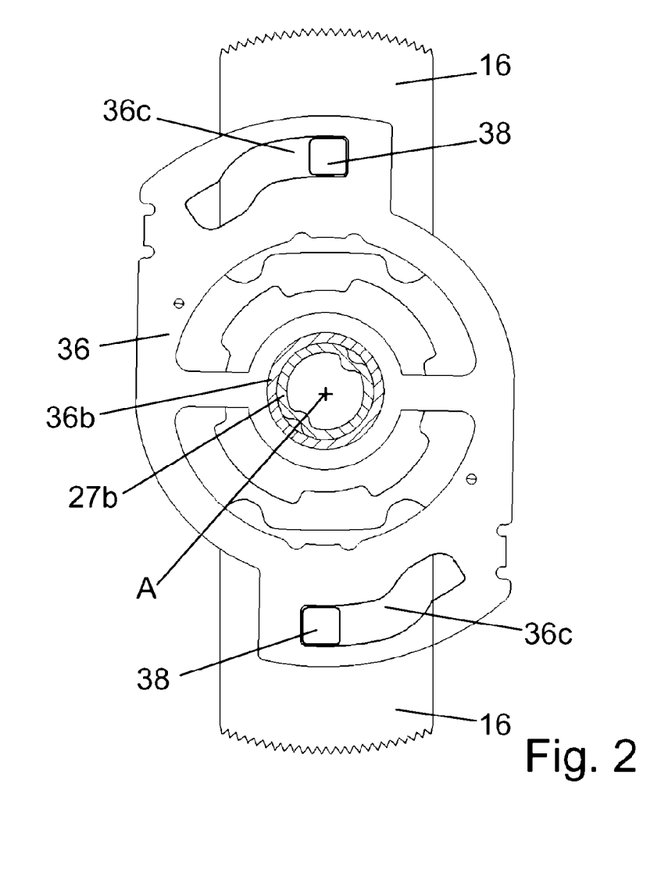
FIG. 2 is a partial view of the fitting with the redirected control cam and therebehind with the bars which are acted on by the control cam and the eccentric in the initial position.

The second fitting member 12 has—in this instance four— guiding segments 14 which, with straight guiding faces, guide a bar 16 in pairs laterally in a radial direction. The—in this instance a total of two—bars 16 are arranged in a state offset relative to each other—in this instance through 180°— in a structural space defined between the two fitting members 11 and 12. The bars 16 are provided at the radially outer end thereof with a tooth arrangement, which can move (fall) into engagement with an internally-toothed toothed ring 17 of the first fitting member 11 which is constructed as an internally toothed wheel. When the toothed ring 17 and the bars 16 cooperate, the fitting 10 is locked. The guiding segments 14 are each in abutment with a bent bearing face on the toothed ring 17 of the first fitting member 11, whereby the two fitting members 11 and 12 are supported one on the other. The first fitting member 11 may be supported on the second fitting member 12. However, the relationships could be precisely transposed, that is to say, the second fitting member 12 may be supported on the first fitting member 11. However, both arrangements are equivalent in principle.

At the centre of the fitting 10—in the structural space defined between the fitting members 11 and 12—an eccentric 27 is arranged. The eccentric 27 which is supported rotatably about the axis A has along the periphery thereof for each bar 16 at least one curved cam which is curved in an eccentric manner with respect to the axis A. In order to rotate the eccentric 27, the eccentric 27 has an eccentric actuation member 27b. In this instance, there is provided as an eccentric actuation member 27b a centrally arranged, axially protruding, preferably formed-on pipe of the eccentric 27, by means of which pipe the eccentric 27 may also be supported in one of the fitting members 11 or 12. The eccentric actuation member 27b has at least partially a profile, for example, with two radially inwardly protruding cams or another spline-shaft-like profile. Two springs 35, for example, two helical springs, are—in a state offset through 90° with respect to the bars 16—supported on the second fitting member 12, for example, with the radially inner helical spring ends thereof.

The two springs 35 act on the eccentric 27, for example, with the radially outer helical spring ends thereof. The eccentric 27 which is acted on by the spring arrangement 35 rotates in the closure direction, interacts with the radially movable bars 16 and acts upon them so that they are pressed radially outward in order to engage in the toothed ring 17, whereby the fitting 10 is locked (in a play-free manner).

A control cam 36 is arranged in the structural space axially between the bars 16 and the first fitting member 11 and can be rotated about the axis A. The control cam 36 has, in this instance two, control paths which each cooperate with a projection 38 of each bar 16. The projections 38 protrude in an axial direction from the bars 16 associated therewith. In order to rotate the control cam 36, the control cam 36 has a cam actuation member 36b. In this instance, there is provided as the cam actuation member 36b a centrally arranged, axially protruding, preferably formed-on pipe of the control cam 36 which is preferably arranged radially outside the eccentric actuation member 27b and supports it within itself, and which is itself supported in a central opening of the first fitting member 11. Consequently, the eccentric 27 is supported on the control cam 36 and the control cam is supported on the first fitting member 11. The cam actuation member 36b has at least partially, that is to say, at the free end thereof at the other side of the first fitting member 11, a profile, for example, with two radially outwardly protruding cams. When the control cam 36 is rotated (and is in advance of the eccentric 27), preferably by a few degrees, in the opening direction, the control cam 36 pulls the bars 16 radially inward, that is to say, out of the toothed ring 17, in order to end the cooperation with the toothed ring 17, whereby the fitting 10 is unlocked and the two fitting members 11 and 12 can be rotated relative to each other about the axis A. The backrest 4 can now be pivoted about the axis A in order to adjust the inclination thereof, that is to say, in order to assume another position for use or non-use position.

In the present embodiment, it is assumed that, with the fitting 10 mounted, the first fitting member 11 is secured to the seat member and is arranged at the side of the fitting 10 facing the inner side of the vehicle seat 1, whilst the second fitting member 12 is secured to the backrest and arranged at the side facing outward from the vehicle seat 1. However, the mirror-inverted and rotated arrangements are also possible in an obvious manner, optionally after structural adaptations. The first fitting member 11 is in this instance secured to an adapter, which is provided for connection to the structure of the seat member 3 and which is referred to below as a lower fitting member 41. The first fitting member 11 is preferably welded to the lower fitting member 41, optionally prepositioned with a positive-locking engagement by means of corresponding contours of the first fitting member 11 and lower fitting member 41.

Figure 3:
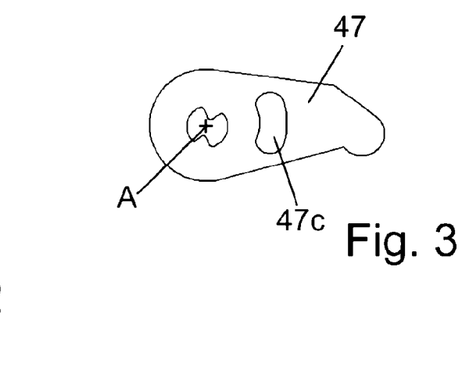
FIG. 3 is a view of the clamping lever.

At the side of the first fitting member 11 and consequently the lower fitting member 41 remote (from the second fitting member 12), there is arranged a clamping lever 47 which is connected to the eccentric 27 in a rotationally secure manner. For example, the clamping lever 47 rests in a rotationally secure (and preferably positive-locking manner) on the eccentric actuation member 27b that protrudes from the fitting 10. The clamping lever 47 can be pivoted about the axis A by means of a first actuation element 51, for example, a lever which is arranged in the region between the backrest 4 and seat member 3 at the outer side of the vehicle seat 1, preferably in order to unlock the fitting 10 for the inclination adjustment of the backrest 4. The first actuation element 51 is, for example, connected in a rotationally secure manner to the correspondingly profiled eccentric actuation member 27b, for example, by means of a profiled shaft. The clamping lever 47 is also intended to be pivoted by means of a second actuation element 52, for example, a lever which is provided at the side of the backrest 4. To this end, there is provided a cable 54 which is operationally connected to the second actuation element 52, preferably a Bowden cable, which carries a nipple 54n at the end thereof. The clamping lever 47 has a clamping lever elongate hole 47c which is curved about the axis A and in which the nipple 54n is suspended, whereby the clamping lever 47 is operationally connected to the second actuation element 52.

Figure 4:
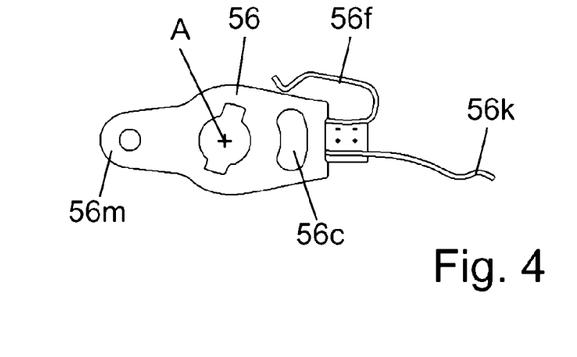
FIG. 4 is a view of the control lever.

A control lever 56 is arranged in an axially offset manner with respect to the clamping lever 47, in this instance axially between the clamping lever 47 and the fitting 10. The control lever 56 has five interfaces. The control lever 56 has as a first interface a profiled opening, by means of which it is connected to the control cam 36 in a rotationally secure manner. For example, the control lever 56 rests in a rotationally secure manner (and preferably in a positive-locking manner) on the disc actuation member 36b which protrudes from the fitting 10 (in the profiled portion thereof). The control lever 56 has as a second interface a control lever elongate hole 56c, which is curved about the axis A and by means of which it is operationally connected to the second actuation element 52, by the nipple 54 being suspended in the control lever elongate hole 56c. The control lever elongate hole 56c and the clamping lever elongate hole 47v preferably have the same shape. The control lever 56 has as a third interface a coupling spring 56f, by means of which it is tensioned counter to the clamping lever 47 and consequently coupled, until the coupling spring 56f has been pretensioned.

The control lever 56 has as a fourth interface a control spring 56k, which is provided for cooperation with a control segment 64 on the backrest 4. The coupling spring 56f and/or the control spring 56k are preferably constructed as leaf springs (preferably of spring steel), optionally also connected integrally to each other and to the base member of the control lever 56 by means of a common securing member in the transition region between the coupling spring 56f and control spring 56k. The control lever 56 has as a fifth interface a control arm 56m which is provided for optional cooperation with a memory device of the seat rails 6, for which, for example, a second cable is suspended on the control arm 56m.

Figure 5:
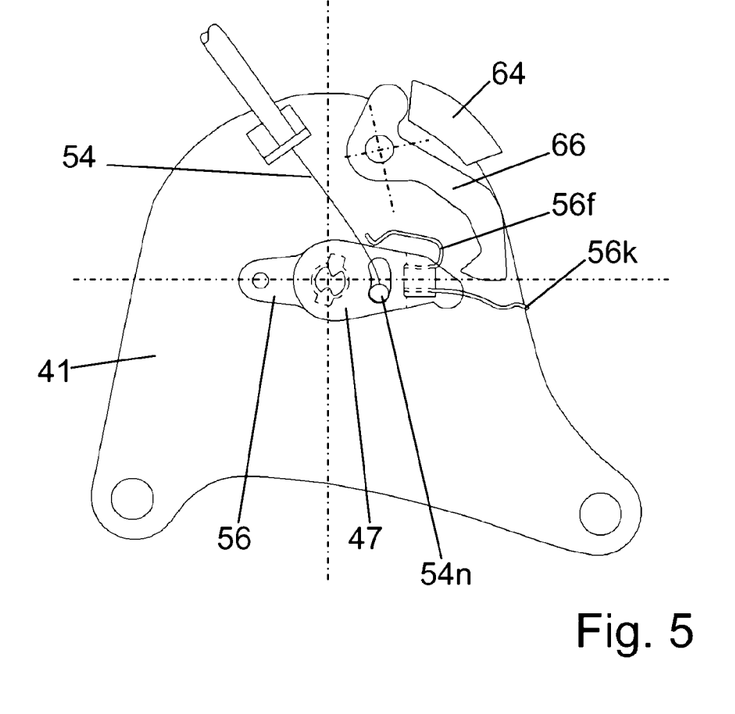
FIG. 5 is a side view of the embodiment in a front position for use with a locked locking lever.

The control segment 64 is formed on the backrest 4 in the vicinity of the lower fitting member 41, for example, as a material formation or a secured cam. A locking lever 66 is pivotably supported on the lower fitting member 41 and is constructed with two arms. The one, upper, arm is constructed for cooperation (that is to say, locking) with the clamping lever 47, the other, lower, arm for cooperation with the control segment 64. The locking lever 66 is (resiliently) pretensioned in the direction toward the clamping lever 47 and is retained, that is to say, locked, by means of the upper arm in all positions for use by the contact with the control segment 64.

In the initial position, the fitting 10 is locked and the backrest 4 is located in a position for use, for example, with a backward inclination of 23° with respect to the vertical. If another inclination of the backrest 4 is intended to be adjusted, that is to say, the backrest 4 is intended to be moved from one position for use into another position for use, the first actuation element 51 is manually actuated. The first actuation element 51 pivots the clamping lever 47. The pivoting clamping lever 47 rotates the eccentric actuation member 27b and consequently the eccentric 27 counter to the force of the springs 35 in the opening direction. The rotating eccentric 27 ends the play release and releases the bars 16. The pivoting clamping lever 47 also passes through a free travel path, which is defined by the clamping lever elongate hole 47c, the control lever elongate hole 56c and the dimension of the nipple 54n. When the free travel path of this slot/pin guide is travelled, the clamping lever 47 also carries the control lever 56 by means of the nipple 54n. Alternatively, the coupling spring 56f is constructed to be so strong that the clamping lever 47 directly carries the control lever 56 (without any free travel path). The pivoting control lever 56 rotates the cam actuation member 36b and consequently the control cam 36 in an opening direction. The rotating control cam 36 acts, by means of the edge of the slotted control members 36c, on the projections 38 which follow the path of the slotted control members 36c and thereby pull the bars 16 (released from the eccentric 27) radially inward. The fitting 10 is unlocked, accordingly also at the other vehicle seat side, so that the backrest 4 can be pivoted into the position for use with the desired inclination.

If the first actuation element 51 is released, the cam 27 rotates owing to the force of the springs 35 in the closure direction back into the initial position thereof, in which it locks the bars 16 in a play-free manner. With the rotation of the eccentric 27, the eccentric actuation member 27b rotates and the clamping lever 47 pivots from the redirected position back into the initial position. The control lever 56 which is in the redirected position follows after a free travel path owing to the nipple 54n or directly owing to the coupling spring 56f. The pivoting control lever 56 rotates the cam actuation member 36b and consequently the control cam 36 in a closure direction back into the initial position. The fitting 10 is locked again.

When the backrest 4 is intended to be moved from a position for use into the non-use position, the second actuation element 52 is manually operated. The second actuation element 52 pulls on the cable 54, which pivots with the nipple 54n thereof, optionally after passing through the elongate holes 47c and 56c, the clamping lever 47 and the control lever 56. The pivoting clamping lever 47 rotates the eccentric actuation member 27b and consequently the eccentric 27 counter to the force of the springs 35 in an opening direction. The rotating eccentric 27 ends the play release and releases the bars 16. The pivoting control lever 56 rotates the cam actuation member 36b and consequently the control cam 36 in an opening direction. The rotating control cam 36 acts by means of the edge of the slotted control members 36c on the projections 38 which follow the path of the slotted control members 36c and thereby pull the bars 16 (released from the eccentric 27) radially inward. The fitting 10 is unlocked, accordingly also at the other vehicle seat side, so that the backrest 4 can be pivoted forward.

Figure 6:
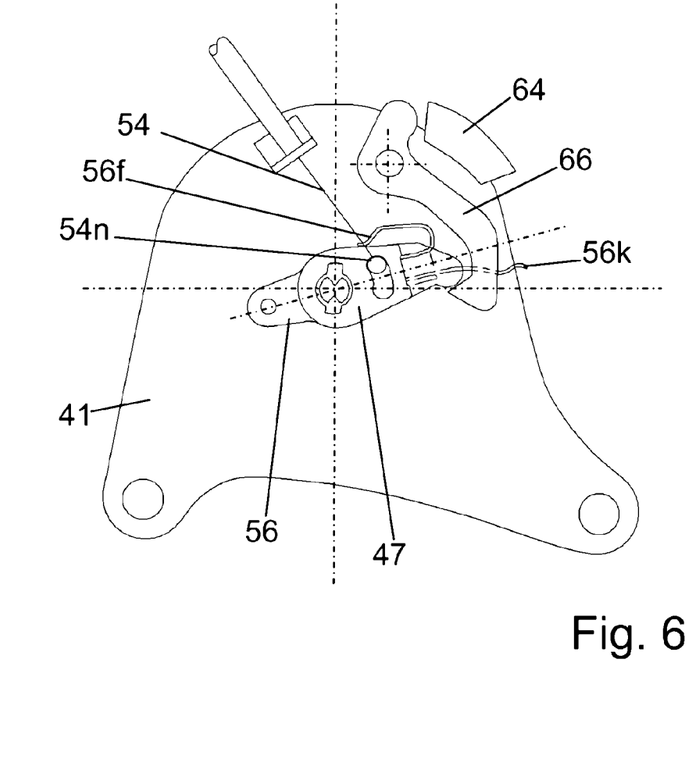
FIG. 6 is a side view which corresponds to FIG. 5 with a redirected control lever, released locking lever and redirected and locked clamping lever.

When the backrest 4 is pivoted, the control segment 64 and the locking lever 66 move relative to each other (FIG. 5). At a specific inclination angle of the backrest 4, that is to say, after passing the foremost position for use, the control segment 64 releases the locking lever 66. The locking lever 66 pivots, owing to its pretensioning, toward the clamping lever 47, which is located in the redirected position thereof and locks it, for example, by engaging behind with the preferably hook-like arm (FIG. 6). The clamping lever 47 is now retained in the redirected position thereof, as is the control lever 56 owing to the coupling spring 56f. The second actuation element 52 can therefore be released for further pivoting of the backrest 4.

Figure 7:
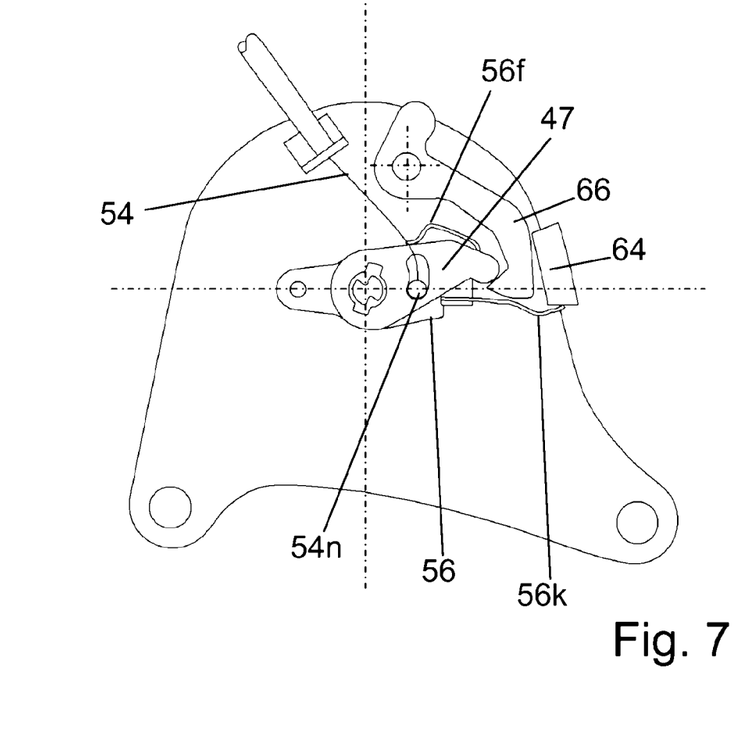
FIG. 7 is a side view corresponding to FIGS. 5 and 6 in the non-use position, with the control lever in the initial position.

Shortly before reaching the non-use position, the control segment 64 moves into abutment with the control spring 56k and thereby also carries the control lever 56 (counter to the force of the coupling spring 56f) with the further pivot movement of the backrest 4. Whilst the pivoting control lever 56 returns to its original position (FIG. 7), it rotates the cam actuation member 36*b*, which rotates the control cam 36 in a closure direction. The control cam 36 carries the projections 38 with the slotted control members 36*c* thereof and thereby moves the bars 16 radially outward. When the projections 38 reach the end of the slotted control members 36*c*, the bars 16 are in engagement with the toothed ring 17, that is to say, the fitting 10 is locked, but subject to play. However, the play of the projections 38 at the end of the slotted control members 36*c* is in any case substantially smaller than the tooth height of the toothed ring 17 and the bars 16.

The slotted control members 36*c* are constructed at the ends thereof in such a manner that the abutment angle between the edge of the slotted control members 36*c* and the adjacent projections 38 is within the self-locking range (positive-locking action) or slightly outside the self-locking range (non-positive-locking action). In the case of the positive-locking action of the fitting 10, the friction forces between the projections 38 and the control cam 36 ensure the securing action; in the case of the non-positive-locking action of the fitting, an additional external force is required, in this instance, for example, the weight force of the backrest 4, which retains the control lever 56 and consequently the control cam 36—in the initial position by means of the control segment 64.

Both with the positive-locking action and theoretically with the non-positive-locking action of the fitting 10, for the return from the non-use position into a position for use, it is possible to actuate the second actuation element 52 which pivots the control lever 56 into the redirected position again by means of the cable 54. The pivoting control lever 56 rotates the control cam 36 in the opening direction by means of the cam actuation member 36*b*, which pulls the bars 16 radially inward, whereby the fitting 10 is unlocked.

In the case of the non-positive-locking action of the fitting 10, for the return from the non-use position into a position for use, the backrest 4 can be acted on with a backwardly acting torque. The torque is transmitted by means of the toothed ring 17 to the bars 16 which, owing to the inclined tooth flanks, are pressed radially inward (whereby the fitting 10 is unlocked) and rotate the control cam 36 in an opening direction by means of the projections 38. The rotating control cam 36, by means of the cam actuation member 36*b*, brings the control lever 56 into the redirected position.

In the case of the positive-locking action of the fitting 10, with memorized seat rails 6, the memory device of the seat rails 6 can be used in order to initiate the return from the non-use position into a position for use of the backrest 4. When the backrest 4 is pivoted and released, the memory device stores the longitudinal seat position of the vehicle seat 1. During or after the forward pivoting of the backrest 4 into the non-use position, the vehicle seat 1 with the seat rails 6 unlocked is pushed forward. If the vehicle seat 1 returns to the stored longitudinal seat position, the memory device transmits a control signal, for example, a control movement or an electrical signal, in particular of a sensor. The memory device is operationally connected to the fitting system, as indicated in FIG. 5. With a purely mechanical solution, the control signal may engage with the control arm 56*m*, for example, by means of the said second cable. With an electromechanical solution, an actuator can be controlled with the electrical signal and also engages with the control arm 56*m*. The electromechanical solution may be more cost-effective and, as a result of the use of intelligent electronic systems, further enable a large number of additional logical connections to the vehicle or the vehicle seat 1. Owing to the engagement on the control arm 56*m*, the control lever 56 pivots into the redirected position, wherein it rotates the control cam 36 in the opening direction by means of the cam actuation member 36*b*, which control cam 36 pulls back the bars 16, whereby the fitting 10 is unlocked.

As soon as the fitting 10 is unlocked, the backrest 4 can be pivoted back again. The control segment 64 is separated from the control spring 56*k*, whereby the locking lever 66 keeps the fitting 10 in the unlocked state. When, after the backrest 4 has been pivoted back, the control segment 64 has reached the locking lever 66 and separates it again from the clamping lever 47, the springs 35 can rotate the eccentric 27 in the closure direction again and pivot the clamping lever 47 into the initial position, the control lever 56 following owing to the nipple 54*n* or the coupling spring 56*f* and rotating the control cam 36 in a closure direction into the initial position. The eccentric 27 acts on the bars 16, moves them radially outward and locks the fitting 10 in a play-free manner.

In particular with a plurality of pivotable, foldable or displaceable vehicle seats in the vehicle, a safety interrogation may be advantageous and verifies the states of additional locking mechanisms before the backrest 4 is pivoted backward in order to prevent safety-critical states.

For example, it is possible to consider use in a foldable vehicle seat 1 whose backrest 4 is first pivoted on the seat member 3, then locks of the base locking provided at the rear end of the vehicle seat 1 are opened and finally the vehicle seat 1 as a whole is pivoted upward into an upright end position about a shaft provided at the front end of the vehicle seat 1. When the fitting system according to the invention and sensors are used for the locking state of the locks, during return to the initial position, it can first be verified by means of the sensors whether the vehicle seat 1 has been pivoted downward from the upright position, and the locks are locked again, before the sensors control an actuator by means of a control signal, which acts on the control arm 56*m* so that the fitting 10 can be unlocked again in the manner described above and the backrest 4 can be pivoted back again.

LIST OF REFERENCE NUMERALS

1 Vehicle seat
3 Seat member
4 Backrest
6 Seat rail
10 Fitting
11 First fitting member
12 Second fitting member
13 Surrounding ring
14 Guiding segment
16 Bar
17 Toothed ring
27 Eccentric
27*b* Eccentric actuation member
35 Spring
36 Control cam
36*b* Cam actuation member
36*c* Slotted control member
38 Projection
41 Lower fitting member
47 Clamping lever
47*c* Clamping lever elongate hole
51 First actuation element
52 Second actuation element
54 Cable
54*n* Nipple
56 Control lever
56*c* Control lever elongate hole
56*f* Coupling spring 56k Control spring
56m Control arm
64 Control segment
66 Locking lever
A Axis

The invention claimed is:

1. A fitting system for a vehicle seat, having at least one fitting, by which a backrest of the vehicle seat can be pivoted relative to a seat member of the vehicle seat from at least one position for use into a non-use position, wherein the fitting comprises:
   a first fitting member having a toothed ring;
   a second fitting member, wherein the first fitting member can be rotated relative to the second fitting member about an axis;
   at least one movable bar, which the second fitting member guides and which locks the fitting in the at least one position for use by cooperation with the toothed ring;
   a pretensioned, rotatably supported eccentric which, by a rotation in the closure direction, moves the at least one bar radially outward in order to cooperate with the toothed ring; and
   a rotatably supported control cam which, when rotated in an opening direction, moves the at least one bar radially inward in order to end the cooperation with the toothed ring,
   wherein the control cam in a state decoupled from the eccentric can be rotated in the closure direction in order to lock the fitting in the non-use position by cooperation of the at least one bar with the toothed ring,
   wherein the eccentric and the control cam are at least temporarily coupled by way of a clamping lever and a control lever provided outside the fitting and axially offset with each other, and
   wherein the clamping lever is connected to the eccentric and the control lever is connected to the control cam.

2. The fitting system as claimed in claim 1, wherein the control cam has at least one slotted control member which cooperates with a projection of the at least one bar, wherein, when the fitting is locked in the non-use position, the abutment angle between the edge of the slotted control member and the adjacent projection is located within the self-locking range or slightly outside the self-locking range.

3. The fitting system as claimed in claim 1, wherein the eccentric has an eccentric actuation member which protrudes outward from the fitting, and the control cam has a cam actuation member which also protrudes outward from the fitting.

4. The fitting system as claimed in claim 3, wherein there is provided a first actuation element which is operationally connected to the clamping lever which is connected to the eccentric actuation member in a rotationally secure manner.

5. The fitting system as claimed in claim 4, wherein the clamping lever and the control lever are coupled for entrainment by at least one of a coupling spring and a slot/pin guide which has a free travel path.

6. The fitting system as claimed in claim 5, wherein the control lever can be pivoted at least one of by a control spring, by a control arm, and within the free travel path of the slot/pin guide in each case in a manner decoupled from the clamping lever.

7. The fitting system as claimed in claim 3, wherein a second actuation element is operationally connected to the control lever, which is connected to the cam actuation member in a rotationally secure manner.

8. The fitting system as claimed in claim 7, wherein there is provided an actuator which, owing to a control signal which is transmitted by at least one sensor, pivots the control lever, in particular with the actuator acting on a control arm of the control lever.

9. The fitting system as claimed in claim 3, wherein, between the backrest and the seat member, a control segment and a pivotable locking lever cooperate and move relative to each other when the backrest is pivoted, wherein the control segment locks the locking lever in the positions for use provided, and wherein the control segment releases the locking lever during movement in the non-use position, which lever then locks the eccentric actuation member.

10. A vehicle seat having a seat member and a backrest which, by a fitting system as claimed in claim 1, is fitted to the seat member, can be pivoted relative thereto and can be locked with various inclination adjustments.

* * * * *